(12) United States Patent
Mariyani et al.

(10) Patent No.: US 11,963,126 B1
(45) Date of Patent: Apr. 16, 2024

(54) NETWORK FUNCTION DEREGISTRATION IN WIRELESS COMMUNICATION NETWORKS

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 89 days.

(21) Appl. No.: 17/372,726

(22) Filed: Jul. 12, 2021

(51) Int. Cl.
*H04W 60/06* (2009.01)
*H04L 67/14* (2022.01)

(52) U.S. Cl.
CPC ............ *H04W 60/06* (2013.01); *H04L 67/14* (2013.01)

(58) Field of Classification Search
CPC ................................ H04W 60/06; H04L 67/14
See application file for complete search history.

(56) References Cited

U.S. PATENT DOCUMENTS

| | | | |
|---|---|---|---|
| 10,638,443 B2 | 4/2020 | Kang et al. | |
| 10,687,300 B2 | 6/2020 | Youn et al. | |
| 2019/0007992 A1 | 1/2019 | Kim et al. | |
| 2019/0021064 A1* | 1/2019 | Ryu | H04W 60/06 |
| 2019/0174449 A1 | 6/2019 | Shan et al. | |
| 2020/0084663 A1* | 3/2020 | Park | H04W 76/27 |
| 2020/0092710 A1* | 3/2020 | Kim | H04W 8/06 |
| 2022/0167446 A1* | 5/2022 | Youn | H04W 48/16 |
| 2022/0201638 A1* | 6/2022 | Arrobo Vidal | H04W 48/08 |
| 2022/0408396 A1* | 12/2022 | Youn | H04W 60/06 |

FOREIGN PATENT DOCUMENTS

WO    2018169340 A1    9/2018

\* cited by examiner

*Primary Examiner* — Nicholas R Taylor
*Assistant Examiner* — Tania M Pena-Santana (57) ABSTRACT

A wireless communication network deregisters network functions. In the wireless communication, a network data system receives a deregistration command that indicates a wireless User Equipment (UE) and forwards the deregistration command to a Unified Data Management (UDM). The UDM receives the indication and determines a Data Network Name (DNN) for the wireless UE. The UDM identifies a network controller and a session controller for the wireless UE based on the DNN. The UDM transfers deregistration notifications to the network controller and session controller. The UDM receives a deregistration acknowledgement from the network controller. The UDM directs the network data system to remove stored session data for the session controller. The network data system receives the direction from the UDM and responsively removes stored session data for the session controller.

20 Claims, 7 Drawing Sheets

NETWORK FUNCTION DEREGISTRATION IN WIRELESS COMMUNICATION NETWORKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network elements in the network cores. The network cores execute the network elements to provide wireless data services to the wireless user devices over the RANs. Exemplary network elements include the Access and Mobility Management Function (AMF), the Session Management Function (SMF), the Unified Data Management (UDM), and the Unified Data Repository (UDR).

Network initiated deregistration is a process that detaches a wireless user device from a wireless network core over a RAN. During a network-initiated deregistration, the UDM receives a deregistration command for the wireless user device from a network operator. The UDM directs the AMF to deregister the wireless user device. The AMF directs the wireless user device to detach from the RAN. The AMF directs the SMF to terminate wireless data services for the wireless user device. The SMF interacts with other network functions to terminate the wireless data service and deregister the wireless user device. The SMF and AMF notify the UDM of the successful deregistration of the wireless user device. The UDM stops storing session data for the SMF and AMF in response to the notifications. When the UDM does not receive the notification from the SMF, the UDM continues to store the session data for the SMF on the UDR. The storage of SMF session data for inactive sessions can cause the UDR to become overloaded. Unfortunately, the UDM inefficiently notifies the SMF through the AMF. Moreover, the UDM does not effectively prevent UDR overload.

Technical Overview

A wireless communication network deregisters network functions. In the wireless communication, a network data system receives a deregistration command that indicates a wireless User Equipment (UE) and forwards the deregistration command to a Unified Data Management (UDM). The UDM receives the indication and determines a Data Network Name (DNN) for the wireless UE. The UDM identifies a network controller and a session controller for the wireless UE based on the DNN. The UDM transfers a first deregistration notification to the network controller and transfers a second deregistration notification to the session controller. The UDM receives a deregistration acknowledgement from the network controller. The network controller directs the wireless UE to deregister with the wireless communication network. The session controller directs a user plane to stop serving the wireless UE. The UDM directs the network data system to remove stored session data for the session controller. The network data system receives the direction from the UDM and responsively removes stored session data for the session controller.

DETAILED DESCRIPTION

Figure 1:
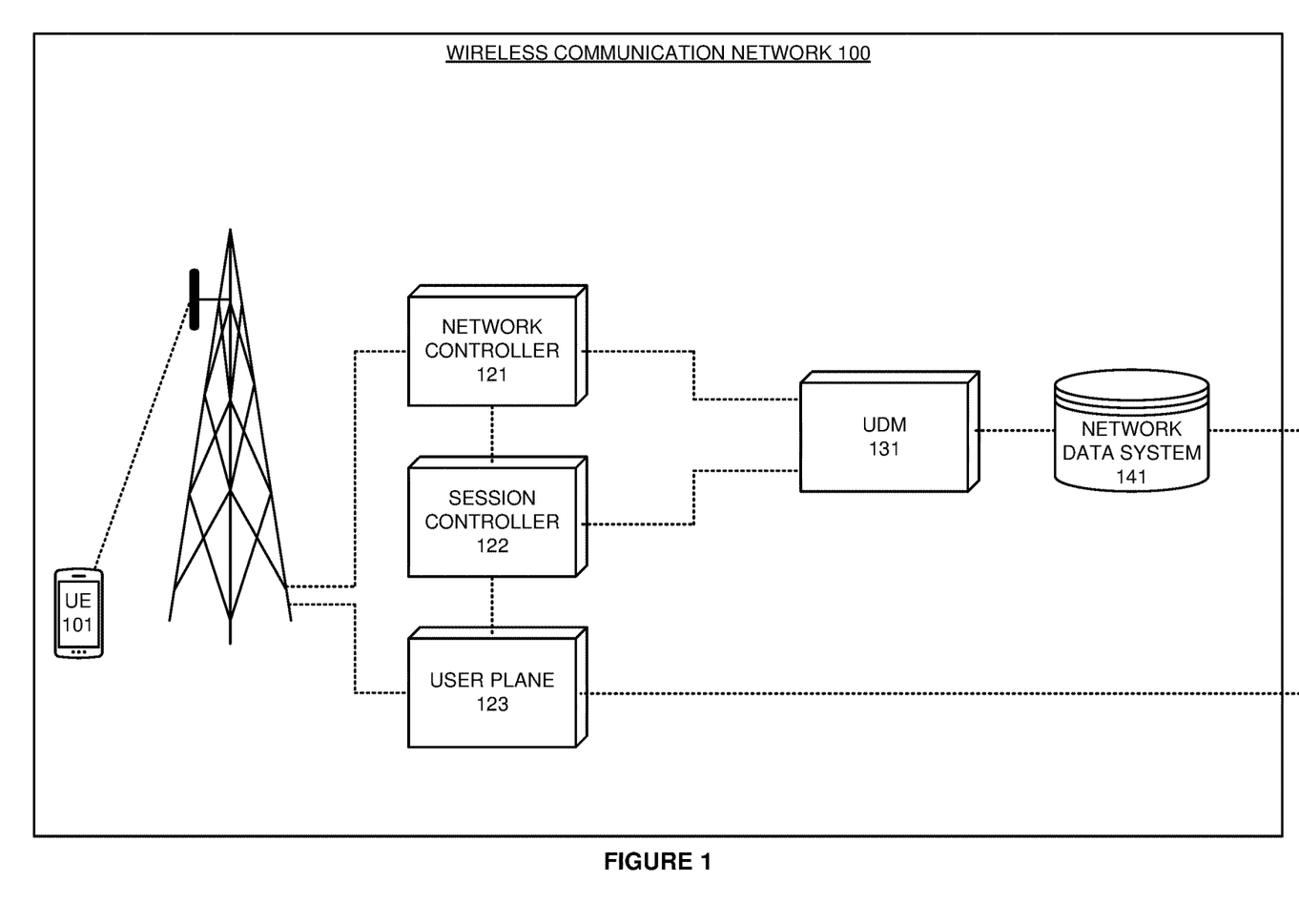
FIG. 1 illustrates a wireless communication network to deregister network functions.

FIG. 1 illustrates wireless communication network 100 to deregister network functions. Wireless communication network 100 delivers services to wireless user devices like internet-access, voice calling, media-streaming, machine communications, or some other wireless communications product. Wireless communication network 100 comprises wireless UE 101, network controller 121, session controller 122, user plane 123, Unified Data Management (UDM) 131, and network data system 141.

Various examples of network operation and configuration are described herein. In some examples, network data system 141 receives a deregistration command that indicates wireless UE 101. For example, the deregistration command may comprise and operator-initiated deregistration of UE 101. Network data system 141 forwards the deregistration command to UDM 131. UDM 131 determines a Data Network Name (DNN) for wireless UE 101. UDM 131 identifies network controller 121 and session controller 122 for wireless UE 101 based on the DNN. UDM 131 transfers a deregistration notification to network controller 121 and transfers a deregistration notification to session controller 122. UDM 131 receives a deregistration acknowledgement from network controller 121. Network controller directs wireless UE 101 to deregister with wireless communication network 100. Session controller directs user plane 123 to stop serving wireless UE 101. UDM 131 directs network data system 141 to remove stored session data for session controller 122. Network data system 141 responsively removes stored session data for session controller 122. Advantageously, UDM 131 efficiently transfers deregistration notifications to session controller 122. Moreover, UDM 131 effectively prevents overload in network data system 141 by removing session data on network data system 141 without receiving a deregistration acknowledgement from session controller 122.

Wireless UE 101 and the Radio Access Network (RAN) illustrated in FIG. 1 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. The RAN, network controller 121, session controller 122, user plane 123, UDM 131, and network data system 141 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), LTE, WIFI, virtual switching, inter-processor communication, bus interfaces, and/or some other data communication protocols.

Wireless UE 101 comprises a computer, phone, vehicle, sensor, robot, or another type of data appliance with wireless communication circuitry. The RAN is depicted as a tower but may use another mounting structure or no mounting structures at all. The RAN comprises Fifth Generation (5G) RAN, LTE RAN, gNodeB, eNodeB, NB-IoT access nodes, LP-WAN base station, wireless relay, WIFI access nodes, Bluetooth access node, and/or some other type of wireless network transceiver. Wireless UE 101 and the RAN comprise antennas, amplifiers, filters, modulation, analog/digital interfaces, microprocessors, software, memories, transceivers, bus circuitry, and the like. Network controller 121 comprises a network function like an Access and Mobility Management functions (AMFs). Session controller 122 comprises a network function like a Session Management Functions (SMFs). User plane 123 comprises a network function like a User Plane Functions (UPF). Network data system 141 comprises network elements like a Uniform Data Registry (UDR), an Unstructured Data Storage Function (UDSF), and the like. UE 101, the RAN, network controller 121, session controller 122, user plane 123, UDM 131, and network data system 141 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
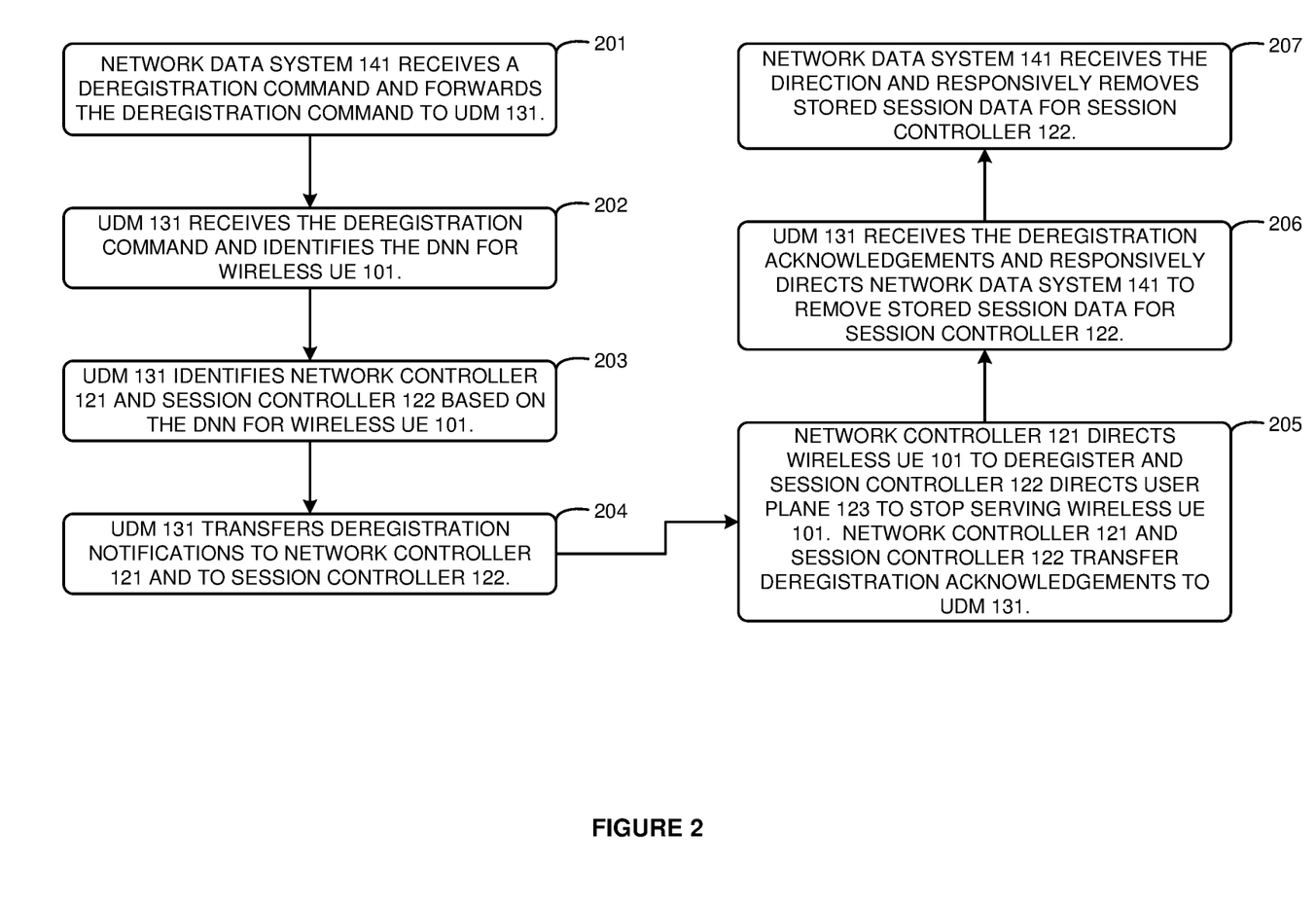
FIG. 2 illustrates an exemplary operation of the wireless communication network to deregister network functions.

FIG. 2 illustrates an exemplary operation of wireless communication network 100 to deregister network functions. The operation may vary in other examples. Network data system 141 receives a deregistration command and forwards the deregistration command to UDM 131 (201). UDM 131 receives the deregistration command and identifies the DNN for wireless UE 101 (202). UDM 131 identifies network controller 121 and session controller 122 based on the DNN for wireless UE 101 (203). UDM 131 transfers deregistration notifications to network controller 121 and to session controller 122 (204). Network controller 121 directs wireless UE 101 to deregister and session controller 122 directs user plane 123 to stop serving wireless UE 101. Network controller 121 and session controller 122 transfer deregistration acknowledgements to UDM 131 (205). UDM 131 receives the deregistration acknowledgements and responsively directs network data system 141 to remove stored session data for session controller 122 (206). Network data system 141 receives the direction and responsively removes stored session data for session controller 122 (207).

Figure 3:
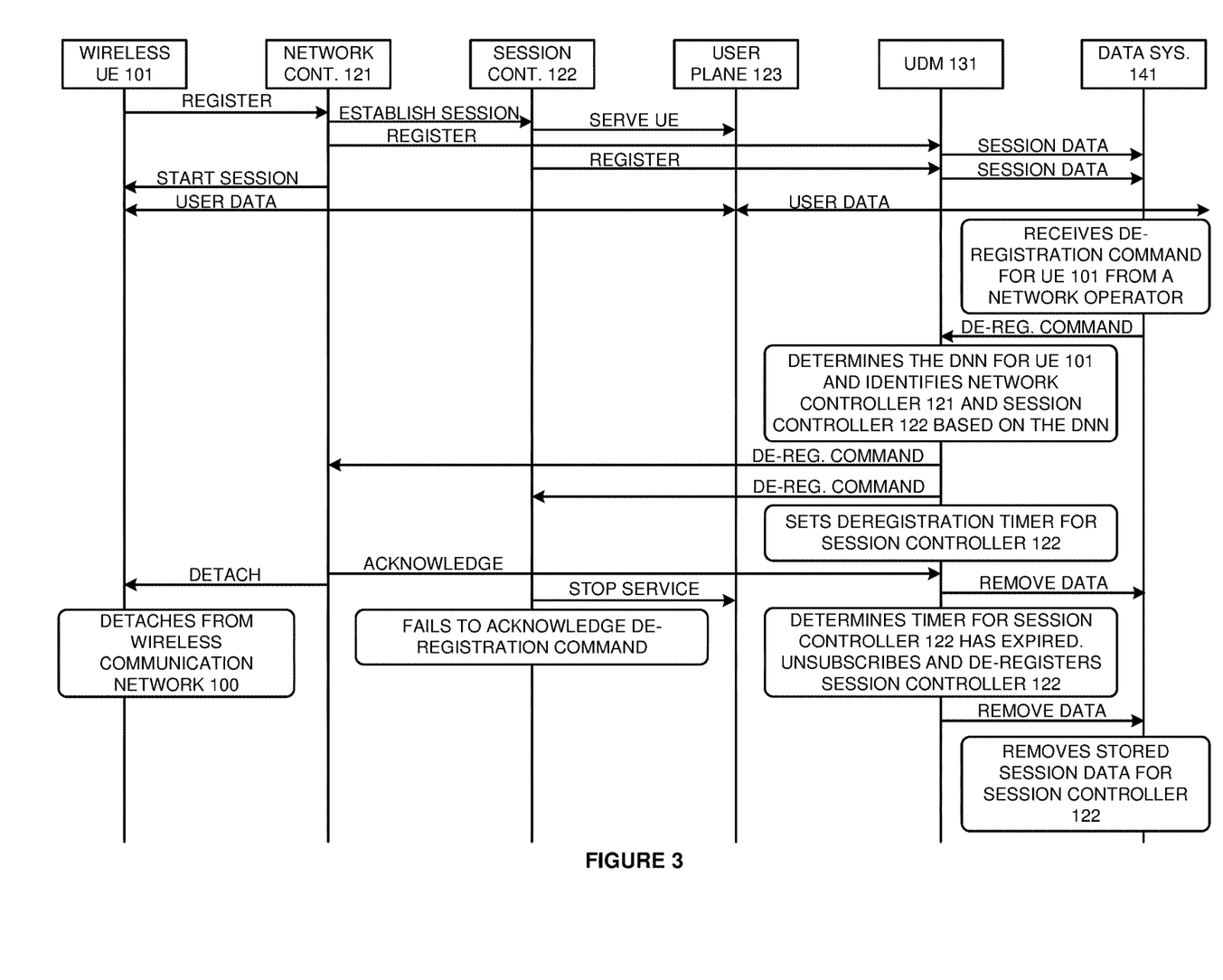
FIG. 3 illustrates another exemplary operation of the wireless communication network to deregister network functions.

FIG. 3 illustrates an exemplary operation of wireless communication network 100 to deregister network functions. The operation may vary in other examples. UE 101 wirelessly attaches to network controller 121 over the RAN. UE 101 wirelessly transfers a registration request for delivery to network controller 121 over the RAN. For example, UE 101 may transfer a registration request to initiate a Protocol Data Unit (PDU) session with wireless communication network 100. Network controller 121 interacts with other network functions to authenticate and authorize wireless UE 101. In response to the authentication and authorization, network controller 121 directs session controller 122 to establish a data session with wireless UE 101. Session controller 122 directs user plane 123 to serve UE 101. Network controller 121 and session controller 122 register with UDM 131 to associate themselves with UE 101. For example, UDM 131 may generate session context for session controller 122 that indicates session controller 122 is serving wireless UE 101. UDM 131 transfers session data to network data system 141. Network data system 141 stores the session data. Network controller 121 directs wireless UE 101 to start the data session. In response, wireless UE 101 exchanges user data with user plane 123 over the RAN. User plane 123 exchanges user data with external systems like data networks.

Network data system 141 receives a deregistration command for UE 101 from a network operator. For example, wireless communication network 100 may require software updates and a network operator may transfer the deregistration command to force-detach UE 101 to allow for the network wide software update. Network data system 141 indicates the deregistration (DE-REG) command to UDM 131. UDM 131 determines the DNN for UE 101. UDM 131 identifies network controller 121 and session controller 122 based on the DNN for UE 101. For example, UDM 131 may retrieve context from network data system 141 for session controller 122 and network controller 121 and responsively identify that session controller 122 and network controller 121 are associated with the DNN of UE 101. UDM 131 generates and transfers deregistration commands for UE 101 to network controller 121 and session controller 122. UDM 131 sets a deregistration timer for session controller 122.

In response to the deregistration command, network controller 121 transfers a deregistration acknowledgement message to UDM 131 and directs wireless UE 101 to detach. UE 101 detaches from wireless communication network 100. UDM 131 receives the deregistration acknowledgement message from network controller 121. UDM 131 directs network data system 141 to remove session data for network controller 121.

In response to the deregistration command, session controller 122 directs user plane 123 to stop serving UE 101. User plane 123 stops exchanging user data for UE 101. Session controller 122 fails to acknowledge the deregistration command from UDM 131. UDM 131 does not receive a deregistration acknowledgement message. UDM 131 determines the deregistration timer for session controller 122 has expired. In response, UDM 131 unsubscribes session controller 122 for events relating to UE 101 and deregisters session controller 122 with UE 101. UDM 131 directs network data system 141 to remove session data for session controller 122. Network data system 141 removes stored data session controller 122 for the session between UE 101 and session controller 122.

Figure 4:
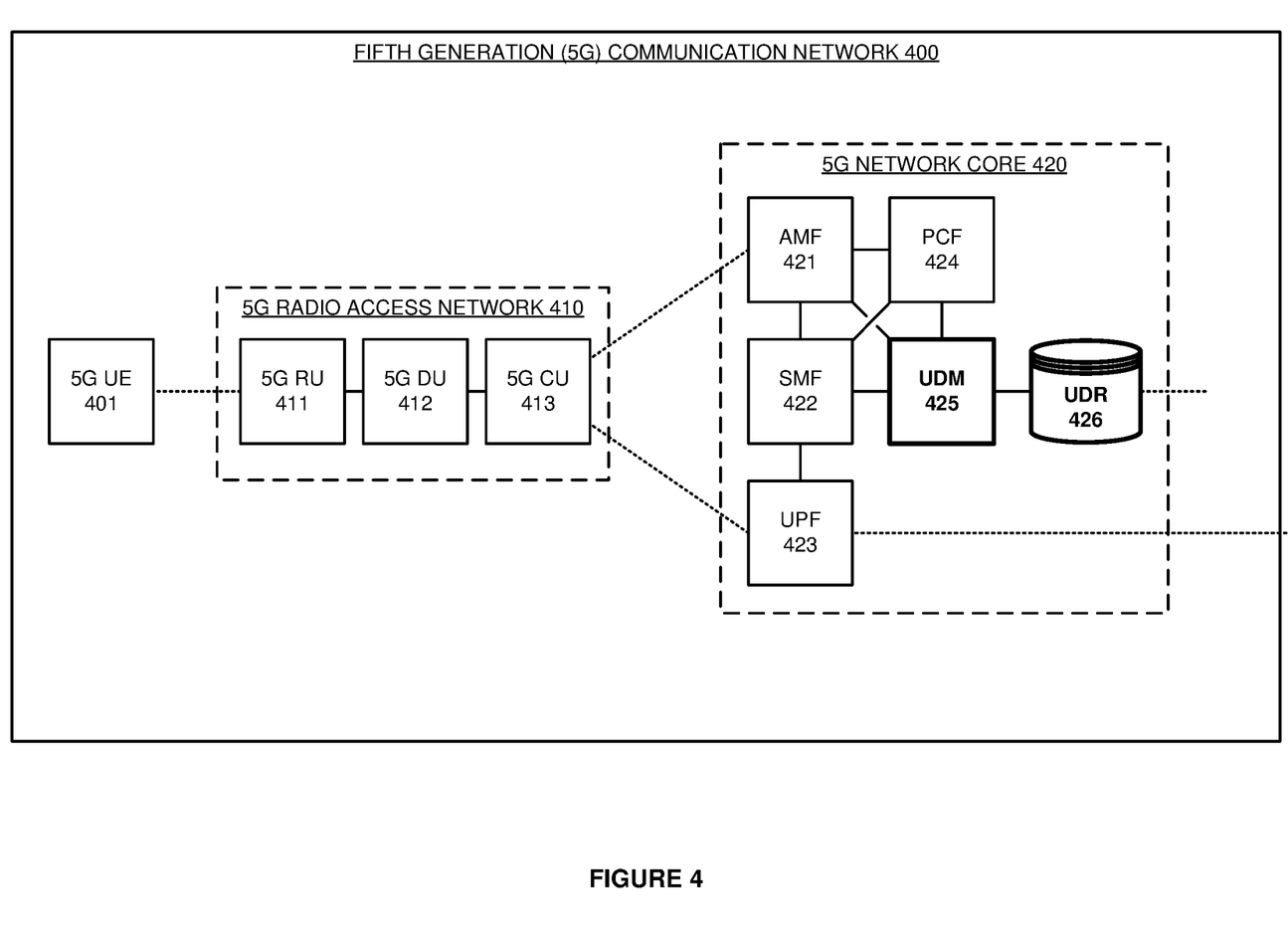
FIG. 4 illustrates a Fifth Generation (5G) communication network to deregister network functions.

FIG. 4 illustrates Fifth Generation (5G) communication network 400 to deregister network functions. 5G communication network 400 comprises an example of wireless communication network 100, although network 100 may differ. 5G communication network 400 comprises 5G UE 401, 5G RAN 410, and 5G network core 420. 5G RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Function (UPF) 423, Policy Control Function (PCF) 424, Unified Data Management (UDM) 425, and Unified Data Registry (UDR) 426. Other network functions and network elements are typically present in network core 420 but are omitted for clarity.

UE 401 wirelessly attaches to RU 411 and transfers attachment signaling to CU 413 over RU 411 and DU 412. CU 413 establishes an RRC connection with UE 401. CU 413 transfers a registration request for UE 401 to AMF 421. The registration request comprises a PDU session request for UE 401. AMF 421 interacts with other network functions to authenticate UE 401 for wireless services. For example, AMF 421 may transfer an authentication request to an Authenticating Server Function (AUSF) in 5G network core 420. Responsive to the authentication, AMF 421 requests UE context for UE 401 from UDM 425. In response to the context request, UDM 425 registers AMF 421 and retrieves the UE context for UE 401 from UDR 426. The UE context indicates service attributes for UE 401 like Data Network Names (DNNs), Quality-of-Service (QoS) values, and authorized Protocol Data Unit (PDU) session types, and the like. UDM 425 transfers the UE context to AMF 421. UDM 425 creates AMF context that associates AMF 421 and UE 401. UDM 425 subscribes AMF 421 for events relating to UE 401 and stores the AMF context in UDR 426.

AMF 421 receives the UE context and determines UE 401 is authorized for wireless data services. AMF 421 retrieves network policies for UE 401 from PCF 424. PCF 424 creates a policy associated between AMF 421 and UE 401. AMF 421 processes the UE context and responsively selects SMF 422 to establish the PDU session for UE 401. AMF 421 directs SMF 422 to serve UE 401 and transfers the UE context to SMF 422. SMF 422 selects UPF 423 to establish the PDU session for UE 401 based on the UE context. For example, SMF 422 may determine UPF 423 serves a DNN indicated by the UE context and responsively selects UPF 423. SMF 422 directs UPF 423 to establish the PDU session for UE 401. SMF 422 generates and transfers session context that indicates UPF 423 to AMF 421. SMF 422 interacts with PCF 424 to create a policy association between SMF 422 and UE 401. SMF 422 registers with UDM 425 and indicates the session context to UDM 425. UDM 425 generates SMF context that associates UE 401 with SMF 422 and subscribes SMF 422 for events relating to UE 401. UDM 425 stores the SMF context for SMF 422 in UDR 426.

AMF 421 transfers the session context to CU 413. CU 413 forwards the session context to UE 401 over DU 412 and RU 411. UE 401 uses to the session context to initiate the PDU session with UPF 423. UE 401 wirelessly exchanges user data with CU 413 over RU 411 and DU 412. CU 413 exchanges user data with UPF 423. UPF 423 exchanges the user data with external systems.

UDR 426 receives an operator-initiated deregistration command for UE 401 from a network operator. For example, UE 401 may require a software update and the network operator may force UE 401 off of 5G communication network 400 to complete the software update. UDR 426 transfers the deregistration command for UE 401 to UDM 425. UDM 425 processes the deregistration command and responsively determines the DNN of UE 401. For example, UDM 425 may retrieve subscriber information for UE 401 from UDR 426 to determine the DNN. UDM 425 determines AMF 421 and SMF 422 are serving UE 401 based on the DNN of UE 401. In response, UDM 425 transfers a deregistration notification for UE 401 to AMF 421. AMF 421 transfers a deregistration request to UE 401 over RAN 410. AMF 421 interacts with PCF 424 to terminate the policy association between AMF 421 and UE 401. AMF 421 transfers a deregistration acknowledgement to UDM 425. UDM 425 deregisters AMF 421 and unsubscribes AMF 421 for events relating to UE 401. UDM 425 directs UDR 426 to clear AMF context for AMF 421 and UE 401. UDR 426 stops storing the AMF context.

UDM 425 transfers another deregistration notification to SMF 422 based on the DNN of UE 401. UDM 425 sets a deregistration timer for SMF 422. UDM 425 determines when the deregistration timer expires. SMF 422 receives the deregistration notification and responsively interacts with PCF 424 to terminate the policy association between SMF 422 and UE 401. SMF 422 directs UPF 423 to end the PDU session with UE 401. UPF 423 stops exchanging user data for UE 401 over RAN 410 and with external systems. SMF 422 transfers a deregistration acknowledgement to UDM 425 prior to the expiration of the deregistration timer. UDM 425 receives the deregistration acknowledgement from SMF 422 responsively ends the deregistration timer. UDM 425 deregisters SMF 422 and unsubscribes SMF 422 for events relating to UE 401. UDM 425 directs UDR 426 to clear SMF context for SMF 422 and UE 401. UDR 426 stops storing the SMF context in memory.

UE 401 accepts the deregistration request from AMF 421. UE 401 detaches from AMF 421 and stops exchanging user data with UPF 423 over RAN 410. UE 401 terminates its wireless connection with CU 413 over RU 411 and DU 412. CU 413 terminates network links for UE 401 with AMF 421.

In some examples, SMF 422 fails to transfer a deregistration acknowledgement to UDM 425. In this case, UDM 425 transfers a deregistration notification to SMF 422 and sets a deregistration timer for SMF 422. UDM 425 determines when the deregistration timer expires. SMF 422 receives the deregistration notification and responsively terminates its policy association with PCF 424 and directs UPF 423 to end the PDU session with UE 401. UPF 423 stops exchanging user data for UE 401. SMF 422 fails to transfer a deregistration acknowledgement to UDM 425. UDM 425 fails to receive a deregistration acknowledgement from SMF 422. When the deregistration timer expires, UDM 425 automatically deregisters SMF 422 and unsubscribes SMF 422 for events relating to UE 401. UDM 425 directs UDR 426 to clear SMF context for SMF 422 and UE 401. UDR 426 stops storing the SMF context in memory.

Figure 5:
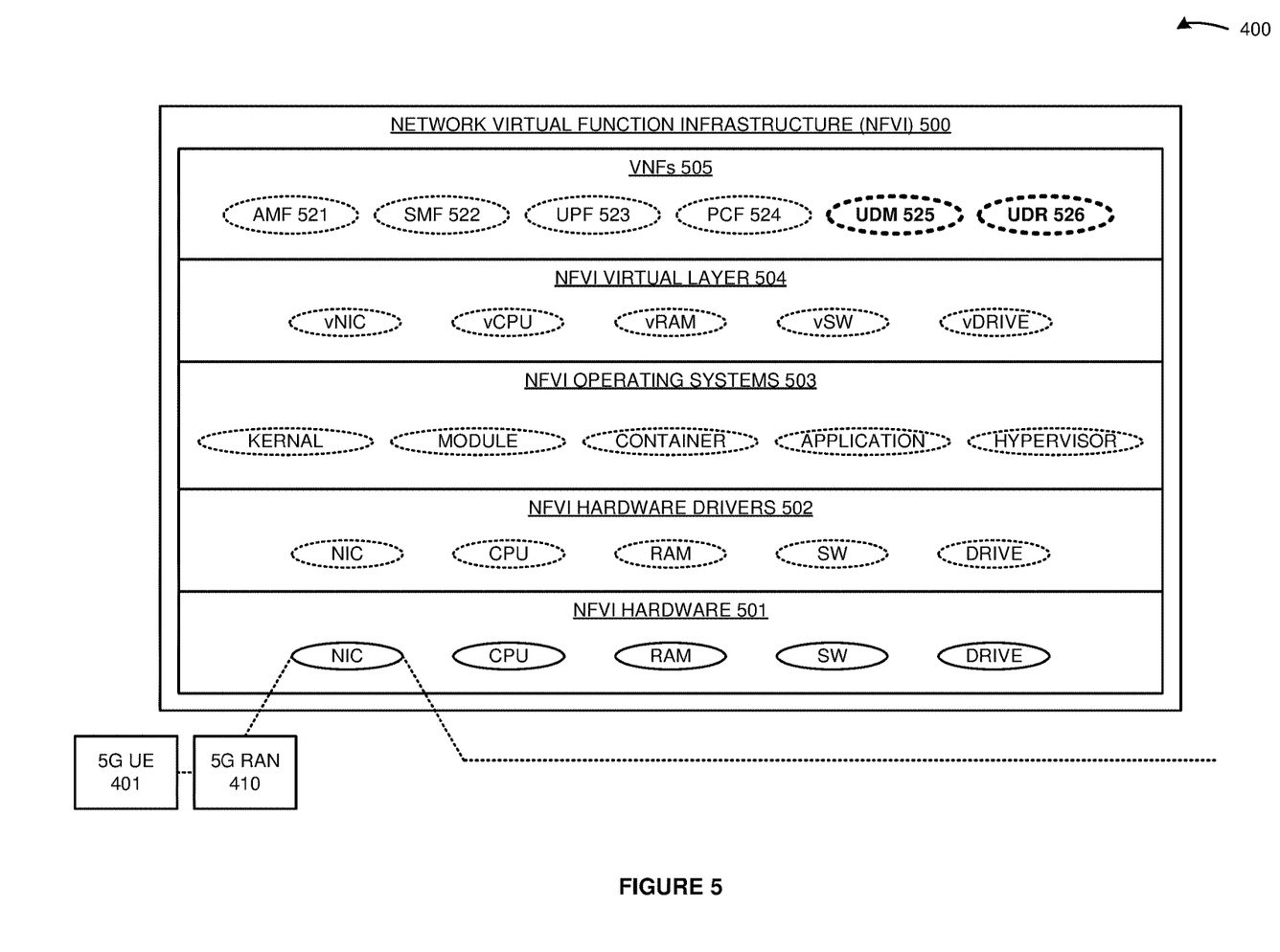
FIG. 5 illustrates a Network Function Virtualization Infrastructure (NFVI) in the 5G communication network.

FIG. 5 illustrates Network Function Virtualization Infrastructure (NFVI) 500 in 5G communications network 400. NFVI 500 comprises an example of network controller 121, session controller 122, user plane 123, UDM 131, and network data system 141, although network controller 121, session controller 122, user plane 123, UDM 131, and network data system 141 may differ from this example. NFVI 500 comprises NFVI hardware 501, NFVI hardware drivers 502, NFVI operating systems 503, NFVI virtual layer 504, and NFVI Virtual Network Functions (VNFs) 505. NFVI hardware 501 comprises Network Interface Cards (NICs), CPU, RAM, Flash/Disk Drives (DRIVE), and Data Switches (SW). NFVI hardware drivers 502 comprise software that is resident in the NIC, CPU, RAM, DRIVE, and SW. NFVI operating systems 503 comprise kernels, modules, applications, containers, hypervisors, and the like. NFVI virtual layer 504 comprises vNIC, vCPU, vRAM, vDRIVE, and vSW. NFVI VNFs 505 comprise AMF 521, SMF 522, UPF 523, PCF 524, UDM 525, and UDR 526. Additional VNFs and network elements like Authenticating Server Function (AUSF), Network Slice Selection Function (NSSF) and Network Exposure Function (NEF) are typically present but are omitted for clarity. NFVI 500 may be located at a single site or be distributed across multiple geographic locations. The NIC in NFVI hardware 501 is coupled to 5G RAN 410 and to external systems. NFVI hardware 501 executes NFVI hardware drivers 502, NFVI operating systems 503, NFVI virtual layer 504, and NFVI VNFs 505 to form AMF 421, SMF 422, UPF 423, PCF 424, UDM 425, and UDR 426.

Figure 6:
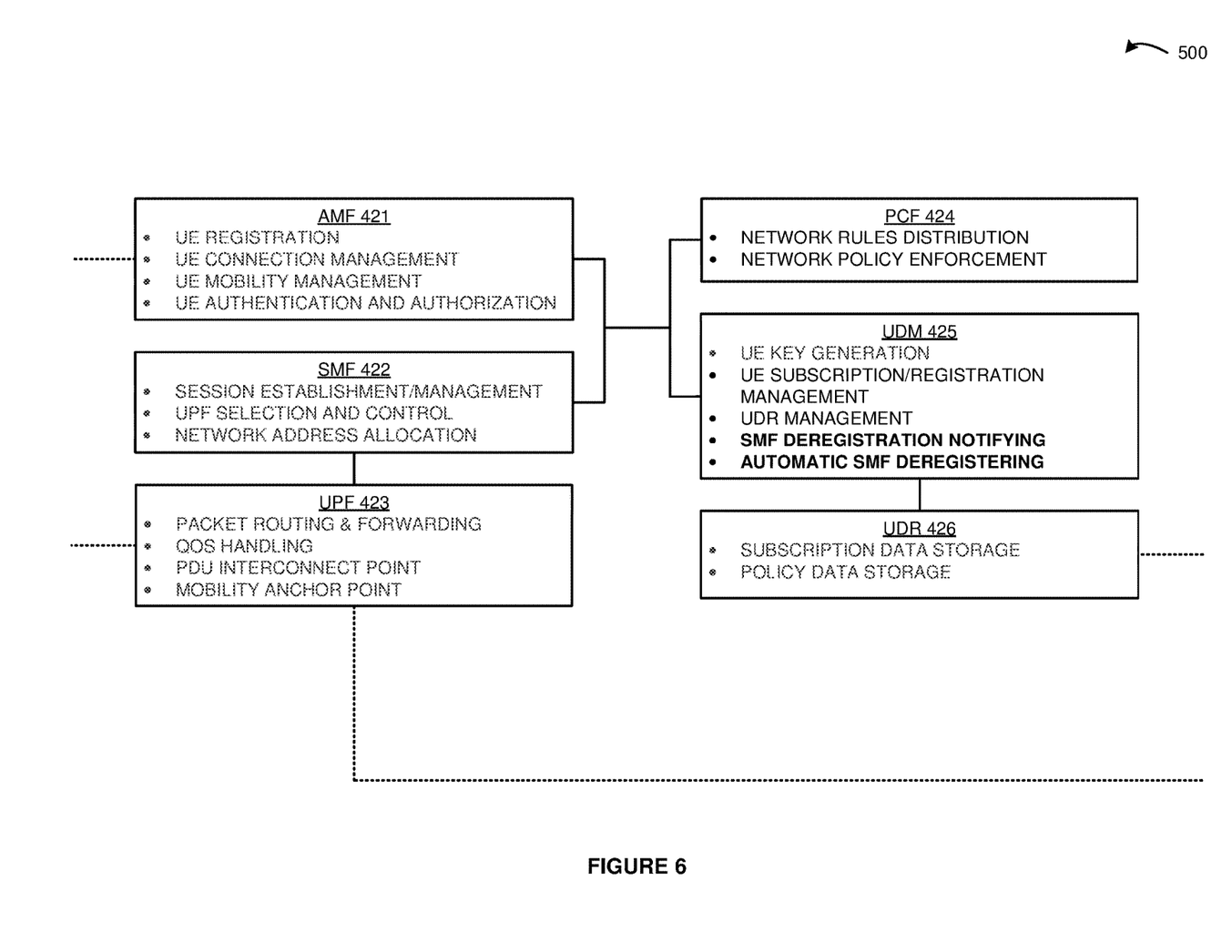
FIG. 6 further illustrates the NFVI in the 5G communication network.

FIG. 6 further illustrates NFVI 500 in 5G communication network 400. AMF 421 performs UE registration and connection, UE connection/mobility management, and UE authentication and authorization. SW; 422 performs session establishment and management, UPF selection and control, and network address allocation. UPF 423 perform packet routing & forwarding, QoS handling, PDU interconnection, and mobility anchoring. PCF 424 performs network rules management and distribution and network policy enforcement. UDM 425 performs UE key generation, UE subscription and registration management, UDR management, SMF deregistration notifying, and automatic SMF deregistration. UDR 426 performs subscription data storage and policy data storage.

In this example, UDM 425 automatically deregisters SMF 422, however the operation may differ in other examples. AMF 421 receives a PDU session request for UE 401 from RAN 410. AMF 421 interacts with other network functions to authenticate UE 401 for wireless services. Responsive to the authentication, AMF 421 requests UE context for UE 401 from UDM 425. UDM 425 registers AMF 421 and retrieves the UE context from UDR 426. UDM 425 transfers the UE context to AMF 421. UDM 425 generates AMF context to associate AMF 421 and UE 401. UDM 425 subscribes AMF 421 for event reporting for UE 401. UDM 425 transfers the AMF context to UDR 426. UDR 426 stores the context in memory.

AMF 421 receives the UE context and determines is authorized services for UE 401 based on the UE context. AMF 421 determines UE 401 is authorized for the requested PDU session type. AMF 421 interacts with PCF 424 to create a policy associated between AMF 421 and UE 401. AMF 421 selects SMF 422 to establish the PDU session for UE 401 based on the UE context. AMF 421 directs SMF 422 to serve the requested PDU session to UE 401 and transfers the UE context to SMF 422. SMF 422 selects UPF 423 to establish the PDU session for UE 401 based on the UE context and the request PDU session type. For example, the requested PDU session type may comprise a low-latency PDU session and SMF 422 may select UPF 423 based on UPF 423's low-latency capabilities. SMF 422 controls the UPF 423 to establish the PDU session for UE 401. SMF 422 transfers session context that indicates UPF 423 to AMF 421. SMF 422 interacts with PCF 424 to create a policy association between SMF 422 and UE 401. SMF 422 registers with UDM 425. SMF 422 transfers the session context to UDM 425. UDM 425 receives the session context and responsively generates SMF context that associates UE 401 with SMF 422. UDM 425 subscribes SMF 422 for event reporting for UE 401. UDM 425 transfers the SMF context to UDR 426. UDR 426 stores the SMF session context in memory.

AMF 421 transfers the session context to UE 401 over RAN 410. UPF 423 begins the PDU session with UE 401. UPF 423 exchanges user data for the PDU session with external data networks. UPF 423 exchanges user data for the PDU session with UE 401 over RAN 410.

UDR 426 receives an operator-initiated deregistration command for UE 401. UDR 426 notifies UDM 425. UDM 425 retrieves subscriber information for UE 401 from UDM 425 and responsively determines the DNN of UE 401. UDM 425 determines AMF 421 and SMF 422 are serving UE 401 based on the DNN of UE 401. UDM 425 transfers a deregistration notification for UE 401 to AMF 421. AMF 421 transfers a deregistration request to UE 401 over RAN 410. AMF 421 terminates its policy association with PCF 424. AMF 421 transfers a deregistration acknowledgement to UDM 425. UDM 425 deregisters AMF 421. UDM 425 unsubscribes AMF 421 for events relating to UE 401. UDM 425 directs UDR 426 to clear the AMF context for AMF 421. UDR 426 stops storing the AMF context.

UDM 425 transfers another deregistration notification to SMF 422 based on the DNN of UE 401. UDM 425 sets a deregistration timer for SMF 422. UDM 425 determines when the deregistration timer expires. SMF 422 receives the deregistration notification and responsively interacts with PCF 424 to terminate the policy association between SMF 422 and UE 401. SMF 422 controls UPF 423 to end the PDU session for UE 401. UPF 423 stops exchanging user data for the PDU session over RAN 410 and with external data networks. SMF 422 fails to transfer a deregistration acknowledgement to UDM 425 prior to the expiration of the deregistration timer. UDM 425 does not receive a deregistration acknowledgement from SMF 422. When the deregistration timer expires, UDM 425 deregisters SMF 422 and unsubscribes SMF 422 for events relating to UE 401. UDM 425 controls UDR 426 to clear the SMF context for SMF 422 and UE 401. UDR 426 stops storing the SMF context in memory.

Figure 7:
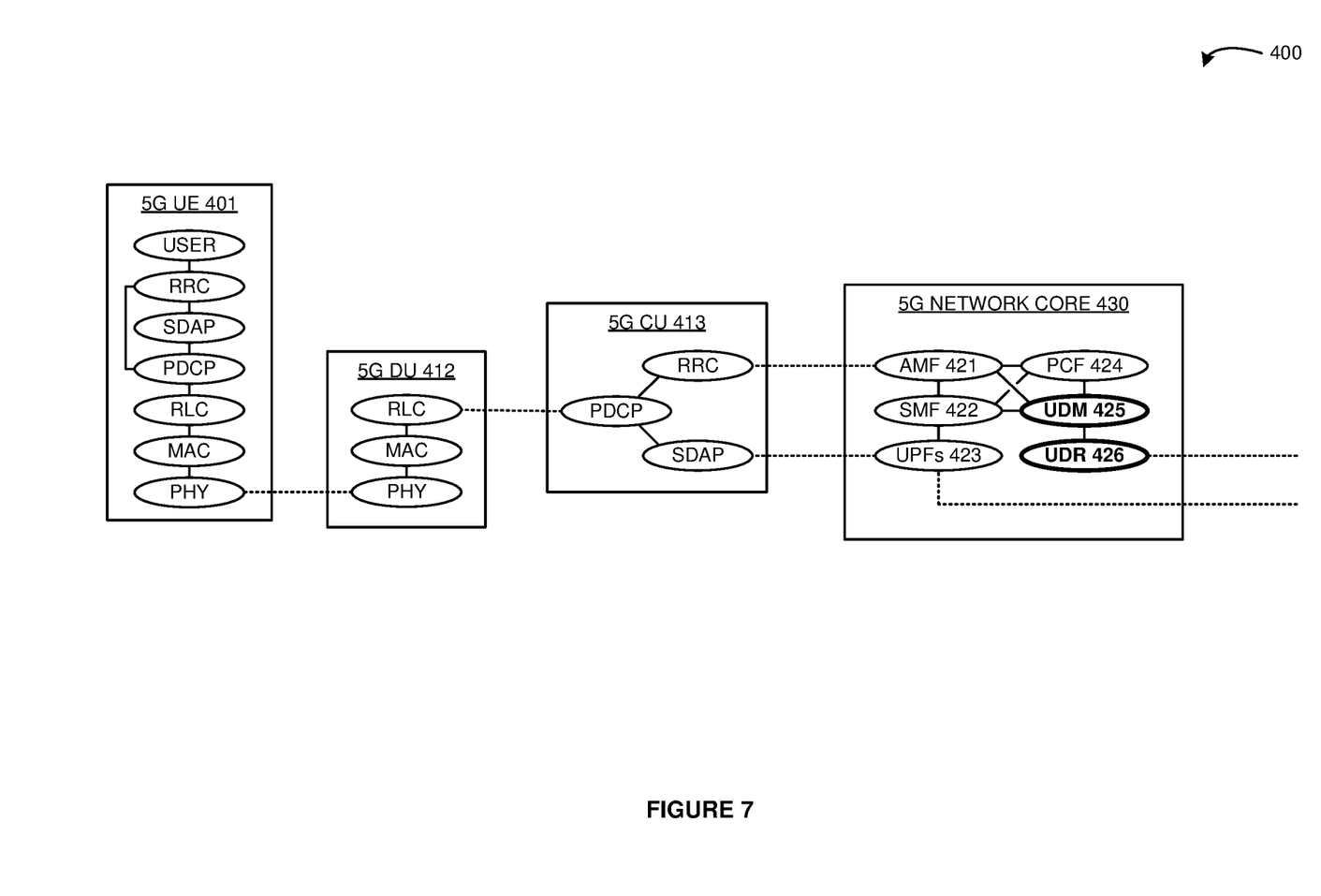
FIG. 7 illustrates an exemplary operation of the 5G communication network to deregister network functions.

FIG. 7 illustrates an exemplary operation of 5G communication network 400 to deregister network functions. The operation may vary in other examples. In this example, UDM 425 deregisters SMF 422 is response to a deregistration acknowledgment, however the operation may differ in other examples. UE 401 stores and executes user applications (USER) and network functions like Radio Resource Control (RRC), Service Data Adaption Protocol (SDAP), Packet Data Convergence Protocol (PDCP), Radio Link Control (RLC), Media Access Control (MAC), and Physical Layer (PHY) to wirelessly communicate with 5G core 420 over RAN 410. Similarly, CU 413 and DU 412 store and execute network functions like RRC, SDAP, PDCP, RLC, MAC, and PHY to facilitate wireless communications between UE 401 and 5G core 420.

In operation, the RRC in UE 401 wirelessly attaches and transfers attachment signaling to the RRC in CU 413 over the PDCPs, RLCs, MACs, and PHYs. The RRC in CU 413 establishes an RRC connection with the RRC in UE 401 over the PDCPs, RLCs, MACs, and PHYs. The RRC in CU 413 transfers a registration request that indicates a PDU session for UE 401 to AMF 421. AMF 421 interacts with other network functions to authenticate UE 401 for wireless services. Responsive to the authentication, AMF 421 interacts with UDM 425 to retrieve UE context for UE 401 from UDM 425. UDM 425 registers AMF 421 and subscribes AMF 421 for events relating to UE 401. UDM 425 retrieves UE context for UE 401 from UDR 426. UDM 425 transfers the UE context to AMF 421. UDM 425 creates AMF context that associates AMF 421 and UE 401. UDM 425 transfers the AMF context to UDR 426. UDR 426 stores the AMF context in memory.

AMF 421 receives the UE context and determines UE 401 is authorized for wireless data services. AMF 421 interacts with PCF 424 to create a policy associated between AMF 421 and UE 401. AMF 421 selects SMF 422 to establish the PDU session for UE 401 based on the UE context. AMF 421 directs SMF 422 to establish the PDU session and transfers the UE context to SMF 422. SMF 422 directs UPF 423 to establish the PDU session for UE 401. SMF 422 generates and transfers session context that indicates UPF 423 to AMF 421. SMF 422 interacts with PCF 424 to create a policy association between SMF 422 and UE 401. SMF 422 transfers the session context to UDM 425. UDM 425 registers SMF 422 and subscribes SMF 422 for events relating to UE 401. UDM 425 generates SMF context that associates UE 401 with SMF 422. UDM 425 transfers the SMF context to UDR 426. UDR 426 stores the SMF context in memory.

AMF 421 transfers the session context to the RRC in CU 413. The RRC in CU 413 forwards the session context to the RRC in UE 401 over the PDCPs, RLCs, MACs, and PHYs. The RRC in UE 401 directs the SDAP in UE 401 to establish the PDU session. The SDAP in UE 401 initiates the PDU session with UPF 423 based on the session context. The SDAP in UE 401 wirelessly exchanges user data for the PDU session with the SDAP in CU 413 over the PDCPs, RLCs, MACs, and PHYs. The SDAP in CU 413 exchanges user data for the PDU session with UPF 423. UPF 423 exchanges user data for the PDU session with external systems.

UDR 426 receives an operator-initiated deregistration command for UE 401 from a network operator. UDR 426 indicates the deregistration command to UDM 425. UDM 425 processes the deregistration command and responsively retrieves subscriber information for UE 401 from UDR 426. UDM 425 determines the DNN for UE 401 based on the subscriber information. UDM 425 identifies AMF 421 and SMF 422 based on the DNN for UE 401. For example, UDM 425 query UDR 426 for AMFs and SMFs that serve that DNN to identify AMF 421 and SMF 422. In response the identification, UDM 425 transfers a deregistration notification for UE 401 to AMF 421. AMF 421 transfers a deregistration request to the RRC in CU 413. The RRC in CU 413 forwards the deregistration request to the RRC in UE 401 over the PDCPs, RLCs, MACs, and PHYs. AMF 421 interacts with PCF 424 to terminate the policy association between itself and UE 401. AMF 421 transfers a deregistration acknowledgement to UDM 425. UDM 425 deregisters and unsubscribes AMF 421. UDM 425 directs UDR 426 to remove AMF context for AMF 421 and UE 401. UDR 426 stops storing the AMF context in memory.

UDM 425 transfers another deregistration notification to SMF 422. UDM 425 sets a deregistration timer for SMF 422. UDM 425 determines when the deregistration timer expires. SMF 422 receives the deregistration notification and interacts with PCF 424 to terminate the policy association between itself and UE 401. SMF 422 controls UPF 423 to end the PDU session with UE 401. UPF 423 stops exchanging user data for the PDU session with the SDAP in CU 413. UPF 423 stops exchanging user data for the PDU session with external systems. SMF 422 transfers a deregistration acknowledgement to UDM 425 prior to the expiration of the deregistration timer. UDM 425 receives the deregistration acknowledgement from SMF 422 responsively stops the deregistration timer. UDM 425 deregisters and unsubscribes SMF 422. UDM 425 directs UDR 426 to remove SMF context for SMF 422 and UE 401. UDR 426 stops storing the SMF context in memory.

The RRC in UE 401 receives and accepts the deregistration request from AMF 421. The RRC in UE 401 detaches from the RRC in CU 413. The RRC in UE 401 directs the SDAP in UE 401 to end the PDU session with UPF 423. The SDAP in UE 401 stops exchanging user data for the PDU session with the SDAP in CU 413 over the PDCPs, RLCs, MACs, and PHYs. The RRC in UE 401 terminates its wireless connection with the RRC in CU 413 over the PDCPs, RLCs, MACs, and PHYs. The RRC in CU 413 terminates network links for UE 401 with AMF 421.

The wireless data network circuitry described above comprises computer hardware and software that form special-purpose network circuitry to deregister network functions. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to deregister network functions.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to deregister network functions, the method comprising:
a Unified Data Registry (UDR) receiving a deregistration command that indicates a wireless User Equipment (UE) and forwarding the deregistration command to a Unified Data Management (UDM);
the UDM receiving the indication, determining a Data Network Name (DNN) for the wireless UE, identifying an Access and Mobility Management Function (AMF) and a Session Management Function (SMF) for the wireless UE based on the DNN, transferring a first deregistration notification to the AMF, transferring a second deregistration notification to the SMF, receiving a deregistration acknowledgement from the AMF, and directing the UDR to remove stored session data for the SMF;
the AMF directing the wireless UE to deregister with the wireless communication network;
the SMF directing a user plane User Plane Function (UPF) to stop serving the wireless UE; and
the UDR receiving the direction from the UDM and responsively removing the stored session data for the SMF.

2. The method of claim 1, further comprising the UDM setting a deregistration timer for the SMF and determining when the deregistration timer expires.

3. The method of claim 2, wherein the UDM determining when the deregistration time expires comprises the UDM determining the deregistration timer has expired prior to receiving a second deregistration acknowledgement from the SMF.

4. The method of claim 3, wherein the UDM directing the UDR to remove the stored session data for the SMF comprises the UDM directing the UDR to remove the stored session data in response to determining the deregistration timer has expired.

5. The method of claim 1, further comprising the UDM receiving a second deregistration acknowledgement from the SMF, wherein the UDM directing the UDR to remove the stored session data for the SMF from the UDR is in response to receiving the second deregistration acknowledgement.

6. The method of claim 1, wherein the UDM directing the UDR to remove stored session data for the SMF comprises the UDM unsubscribing the SMF for the wireless UE and deregistering the SMF with the wireless UE.

7. The method of claim 1, wherein the UDR receiving the deregistration command comprises the UDR receiving the deregistration command from a network operator.

8. The method of claim 1, wherein the UDR receiving the deregistration command comprises the UDR receiving the deregistration command in response to a software update requirement for the wireless UE.

9. The method of claim 1, wherein the UDM determining the DNN for the wireless UE comprises the UDM retrieving subscriber information for the wireless UE from the UDR to determine the DNN.

10. The method of claim 1, wherein the session data comprises SMF context.

11. A wireless communication network configured to deregister network functions, the wireless communication network comprising:
a Unified Data Registry (UDR) configured to receive a deregistration command that indicates a wireless User Equipment (UE) and forward the deregistration command to a Unified Data Management (UDM);
the UDM configured to receive the indication, determine a Data Network Name (DNN) for the wireless UE, identify an Access and Mobility Management Function (AMF) and a Session Management Function (SMF) for the wireless UE based on the DNN, transfer a first deregistration notification to the AMF, transfer a second deregistration notification to the SMF, receive a deregistration acknowledgement from the AMF, and direct the UDR to remove stored session data for the SMF;
the AMF configured to direct the wireless UE to deregister with the wireless communication network;
the SMF configured to direct a User Plane Function (UPF) to stop serving the wireless UE; and
the UDR configured to receive the direction from the UDM and responsively remove the stored session data for the SMF.

12. The wireless communication network of claim 11, further comprising the UDM configured to set a deregistration timer for the SMF and determine when the deregistration timer expires.

13. The wireless communication network of claim 12, wherein the UDM is configured to determine when the deregistration timer expires comprises the UDM configured to determine the deregistration timer has expired prior to receiving a second deregistration acknowledgement from the SMF.

14. The wireless communication network of claim 13, wherein the UDM is configured to direct the UDR to remove the stored session data for the SMF comprises the UDM configured to direct the UDR to remove the stored session data in response to determining the deregistration timer has expired.

15. The wireless communication network of claim 11, further comprising the UDM configured to receive a second deregistration acknowledgement from the SMF, wherein the UDM is configured to direct the UDR to remove the stored session data for the SMF from the UDR is in response to receiving the second deregistration acknowledgement.

16. The wireless communication network of claim 11, wherein the UDM is configured to direct the UDR to remove stored session data for the SMF comprises the UDM configured to unsubscribe the SMF for the wireless UE and deregister the SMF with the wireless UE.

17. The wireless communication network of claim 11, wherein the UDR is configured to receive the deregistration command comprises the UDR configured to receive the deregistration command from a network operator.

18. The wireless communication network of claim 11, wherein the UDR is configured to receive the deregistration command comprises the UDR configured to receive the deregistration command in response to a software update requirement for the wireless UE.

19. The wireless communication network of claim 11, the UDM is configured to determine the DNN for the wireless UE comprises the UDM configured to retrieve subscriber information for the wireless UE from the UDR to determine the DNN.

20. The wireless communication network of claim 11, wherein the session data comprises SMF context.

* * * * *